United States Patent [19]
Bradley, Jr.

[11] 3,726,549
[45] Apr. 10, 1973

[54] PIPE JOINT RETAINER GLAND

[76] Inventor: Earl C. Bradley, Jr., 2 Roundrock Circle, Richardson, Tex. 75080

[22] Filed: Sept. 15, 1971

[21] Appl. No.: 180,812

[52] U.S. Cl. ................................. 285/356, 285/374
[51] Int. Cl. ............................................. F16l 23/00
[58] Field of Search ..................... 285/337, 356, 404, 285/374

[56] References Cited

UNITED STATES PATENTS

| 3,333,872 | 8/1967 | Crawford et al. | 285/404 X |
| 3,415,547 | 12/1968 | Yano | 285/337 |
| 884,749 | 4/1908 | Mason | 285/356 X |
| 618,587 | 1/1899 | Simmons | 285/356 X |

*Primary Examiner*—Thomas F. Callaghan
*Attorney*—H. Mathews Garland

[57] ABSTRACT

A mechanical joint including an integral bell on a first pipe provided with a flange having axial bolt holes, a plain end on a second pipe receivable in the bell, an annular gasket for sealing around the plain pipe end within the bell, and a retainer gland having bolt holes aligned with bolt holes in the bell flange for the securing of the gland with the bell flange to hold the gasket in sealed relationship between the gland, the plain pipe end, and the bell, the retainer gland being particularly characterized by circumferentially spaced set screws disposed radially through tapped holes partially in the gland lip and partially in the gland flange and extending through arcuate recesses provided in the gland flange with arcuate protuberances or bosses on the back face of the flange aligned with the arcuate recesses. The gland is disposed on the bare pipe end and secured to the bell flange by tee-head bolts while the set screws through the gland are tightened against the plain pipe end for holding the joint together to maintain the pipe with the plain pipe end coupled into the pipe with the bell while the gland additionally holds the gasket in a sealed relationship around the plain pipe end within the bell confined by the gland lip.

7 Claims, 9 Drawing Figures 3,726,549

INVENTOR
Earl C. Bradley, Jr.

BY  W. Mathew Garland

ATTORNEY

INVENTOR
Earl C. Bradley, Jr.

BY
ATTORNEY

PIPE JOINT RETAINER GLAND

This invention relates to mechanical pipe joints and more particularly relates to a retainer gland for use in a mechanical pipe joint.

Included in the various types of joints available for conducting fluids are "push-on joints" and "mechanical joints." The push-on joint is useful for pipes and fittings conveying water, sewage, or other liquids, while the mechanical joint performs these functions in addition to being also adaptable to the conduction of gas. The present invention is particularly concerned with a mechanical joint as shown in the American Standards Association publication by the American Water Works Association, Inc., published in 1964, entitled AMERICAN STANDARD FOR RUBBER GASKET JOINTS FOR CAST-IRON PRESSURE PIPE AND FITTINGS, which defines a mechanical joint as including a bell formed integral with a first pipe and provided with an exterior flange having cored or drilled bolt holes, a plain end pipe or fitting on a second pipe of the joint and receivable in the bell, a sealing gasket, a follower gland with cored or drilled bolt holes and tee-head bolts and hexagon nuts. The present invention is particularly concerned with a form of the follower gland often referred to as a "retainer gland." The gland of the mechanical joint illustrated and described in the American Water Works Association publication does not include the set screws employed in the present invention and, thus, there is no provision in the joint for securing or locking together the pipes against axial or longitudinal parting other than the frictional resistance provided by the inwardly squeezed gasket. Thus, in accordance with such publication, the successful operation of such a mechanical joint with a follower gland requires that adequate anchorage be provided where there are abrupt changes in direction and where dead ends occur. Several approaches have been taken to solve the problem of more securely fastening the mechanical joint together so that less attention need be given to anchoring the pipes against pulling apart. One approach to a solution to the problem is the placement of set screws through lugs formed on the back side or face of the gland flange, that is, away from the flange lip, and circumferentially disposed around the gland between the tee-bolt holes in the gland flange. The use of such lugs, however, increases the weight of the gland substantially because it requires the addition of enough metal to the back side of the gland flange to fully accommodate the set screws and additionally to provide enough metal thickness around the set screws so that the gland has the strength required for the set screw to perform its function in holding the gland and the plain pipe end against relative movement. Another approach to the problem is found in the use of circumferentially spaced radial set screws through the lip of the gland. Such set screw placement, however, requires an excessively long set screw to pass through the gland and engage the outer surface of the bare pipe end withing the gland, and, most importantly, a lengthened lip is required to accommodate the set screw. When the lip is lengthened for the set screw, the follower gland flange is necessarily spaced longitudinally farther from the bell flange and, thus, the tee-head bolts used must be longer than standard bolts for the particular size joint being assembled. Such extra long bolts are not normally stocked on a job location in the field and generally are not normally indicated in published data for a standard mechanical joint for the particular size involved. Thus, in handling such a joint with set screws through the retainer gland lip, the field worker often starts assembling the joint only to realize that he does have on hand the proper length bolts. Additionally, where the job requires the use of a mixture of plain mechanical joints and joints having set screws through the lip of the retainer gland, two lengths of tee-bolts must be carried in stock and must be available at the locations of the various joints to minimize the time required for assembling the pipes.

It is a principal object of the invention to provide a new and improved mechanical joint for interconnecting pipes used for conducting fluids such as water, sewage, gas, and other liquids. It is another object of the invention to provide a mechanical joint of the character described which includes set screw means for positively securing or fastening the components of the mechanical joint together. It is an especially important object of the invention to provide a new and improved retainer gland for use in a mechanical joint for interconnecting pipes. It is another object of the invention to provide a new and improved retainer gland which utilizes radial set screws for anchoring the gland to a bare pipe end. It is another object of the invention to provide a retainer gland with set screws disposed to permit use of a normal length gland lip and reduce added strengthening metal so that the gland weight is held to a minimum. It is another object of the invention to provide a new and improved retainer gland for use in mechanical joints with standard length tee-head bolts.

In accordance with the invention, there is provided a retainer gland for use in a mechanical pipe joint which includes integral lip and flange portions provided with circumferentially spaced tee-head bolt holes through the flange portion and circumferentially spaced radial set screw holes disposed partly through the lip portion and partly through the flange portion of the gland. An arcuate clearance recess is formed in the front face of the gland flange on the lip side of the flange radially aligned with each set screw tap to receive a substantial portion of the body of the set screw when the screw is engaged in the tap. An arcuate bulge, boss, or protuberance is formed integral with the gland flange along the back face of the flange aligned with each set screw clearance recess in the flange.

The invention, together with its objects and advantages, will be more fully understood from the following detailed description of a mechanical joint including a preferred form of retainer gland embodying the invention taken in conjunction with the accompanying drawings wherein.

Figure 1:
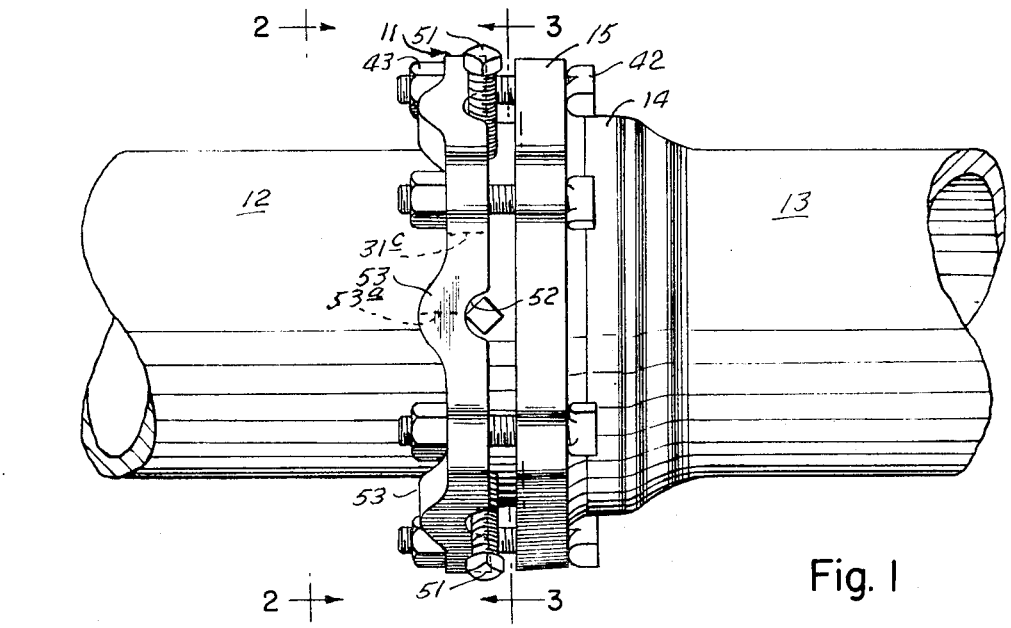
FIG. 1 is a fragmentary side view in elevation, illustrating a mechanical joint including a retainer gland embodying the invention.
Figure 2:
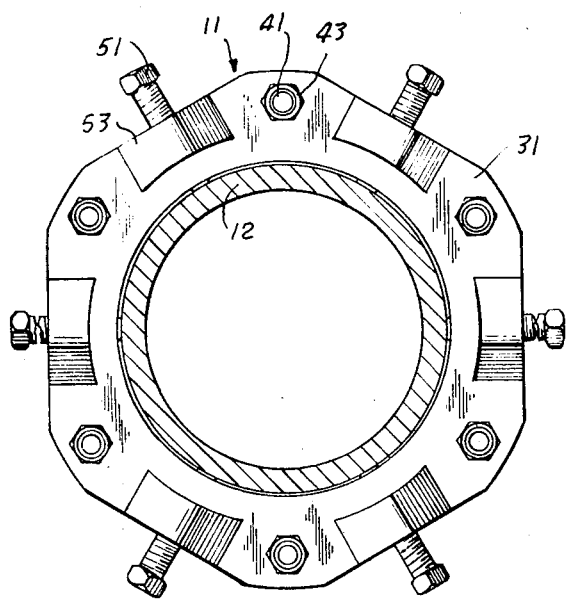
FIG. 2 is a view in section and elevation along the line 2—2 of FIG. 1.
Figure 3:
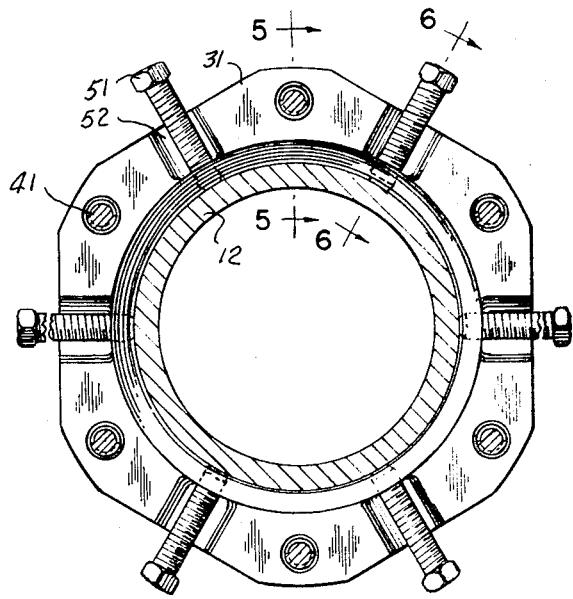
FIG. 3 is a view in section and elevation along the line 3—3 of FIG. 1.
Figure 4:
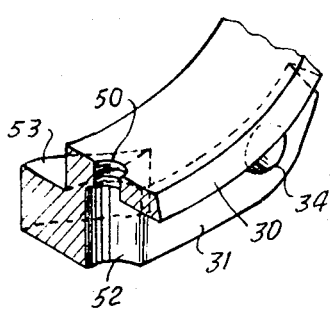
FIG. 4 is a fragmentary perspective view showing a portion of the retainer gland of the invention.

Referring to the drawings, particularly FIG. 1, a mechanical joint 10, including a retainer gland 11 embodying the invention is used for connecting the ends of axially aligned pipes 12 and 13. As clearly evident in FIGS. 5 and 6, the pipe 12 has a plain end 12a. The pipe 13 has an integral enlarged bell fitting 14 with a bell flange 15. The flange 15 has a plurality of axially extending, circumferentially spaced bolt holes 20. The bell has an internal annular recess 21 shaped to receive a gasket 22. At the juncture of the bell with the body of the pipe 13, an internal sloping stop shoulder 23 is formed which limits the movement of the plain pipe end 12a into the bell. The gasket is a standard mechanical joint gasket of annular or circular shape in overall configuration and having an irregular pentagon cross section shape as evident in FIGS. 5 and 6.

The retainer gland 11, in accordance with the invention, is an integral annular member formed by a lip portion 30 and a flange portion 31. The bore 32 through the gland is slightly larger in diameter than the plain pipe end 12a so that the gland is easily positioned around the pipe end. The forward end of the lip 30 is provided with an inwardly bevelled end edge 33 which engages the gasket 22 for urging the gasket into the gasket recess 21 of the bell 14. The flange portion 31 of the gland is provided with a plurality of circumferentially spaced, axially aligned plain holes 34 which are sized and positioned to register with the holes 20 in the flange 15 of the bell 14.

Figure 5:
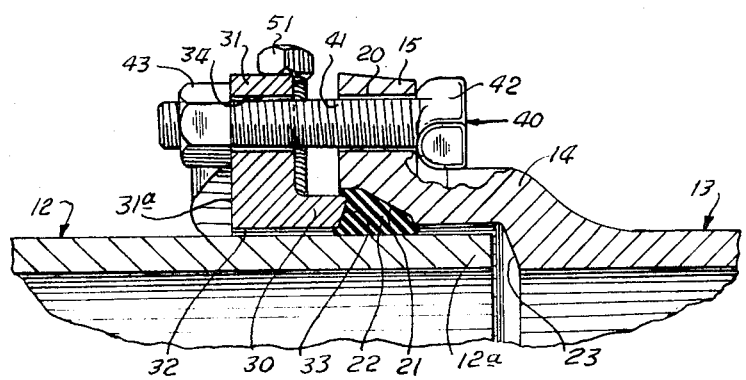
FIG. 5 is an enlarged fragmentary view in section along the line 5—5 of FIG. 3, showing one of the tee-head bolts used to hold the mechanical joint together.

The gland 11 is secured to the bell flange 15 by tee-headed bolts 40 each of which has a threaded shank 41 and a tee-shaped head 42. The diameters of the flange holes 20 and 34 in the flanges 15 and 31, respectively, are sufficiently larger than the diameter of the bolt shanks 41 that the bolts are freely placed through the holes of both flanges during the assembly of the mechanical joint. Each of the bolts is secured by a hexagon shaped nut 43 threaded on the bolt shank against the back face 31A of the gland flange 31. The tee-head 42 on each of the bolts is sufficiently long to prevent the bolts from rotating when it is in position as shown in FIG. 5. One of the wings of the head of each bolt strikes the outer surface of the bell 14 preventing the bolt from rotating as the nut 43 is tightened.

Figure 6:
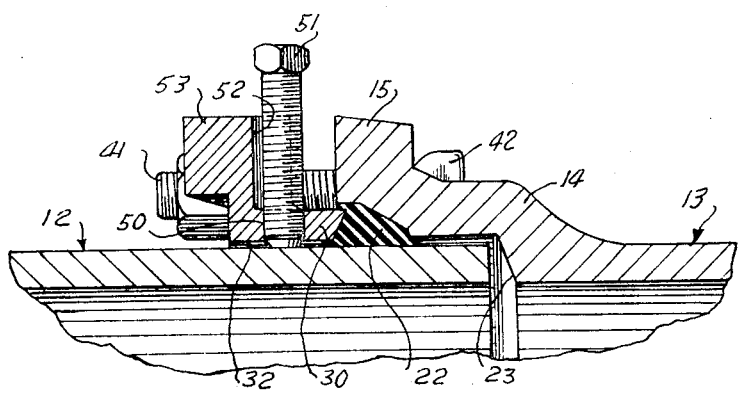
FIG. 6 is a fragmentary view in section along the line 6—6 of FIG. 3, illustrating one of the set screws for holding the bare pipe end in the retainer gland.
Figure 9:
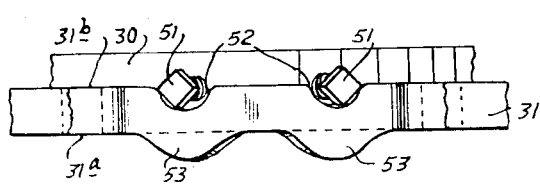

In accordance with the invention, the retainer gland 11 is provided with a plurality of circumferentially spaced radially aligned taps or threaded holes 50 positioned partially in the lip 30 and partially through an inner portion of the flange 31, as particularly evident from FIGS. 1, 6 and 9. Approximately one-half to slightly more than one-half of each of the taps 50 lies within the flange 31 while the remainder of each of the taps lies within the lip 30. Each of the taps is properly sized and threaded to receive a set screw 51 which is threaded through the tap against the outer surface of the plain pipe end 12a for locking the retainer gland 11 on the pipe end. The taps 50 are disposed between the holes 34 provided for the tee-headed bolts. At each of the taps 50 the flange 31 is provided with a clearance recess or indentation 52 along the front face 31b of the flange which is defined as that face on the side of the flange toward the lip 30. Each recess 52 is, generally, an arcuate depression and preferably is a semicylindrical recess larger than the tap 50 and developed along a radial axis coincident or substantially coincident with the axis of the tap 50. Each recess 52 provides clearance for the set screw 51 in the tap encompassed by the recess so that the set screw may be freely threaded into the tap and tightened against the pipe end 12a. At each of the clearance recesses 52, the gland flange 31 is provided on its front face 31a with a boss or protuberance 53 which is arcuate shaped, projects rearwardly from the back face 31a of the gland flange, and is of a depth measured radially equal to or slightly less than the radial depth of the clearance recesses 52. Each protuberance provides the gland flange with sufficient metal that the flange retains full strength around each of the clearance recesses. As particularly evident in FIG. 1, the effective thickness of the flange 31 is retained along each of the protuberances 53 around the clearance recesses 52. For example, a measurement of the wall thickness along the protuberance 53 at the line 53a is substantially the same as the thickness in an axial direction as along the line 31c of the gland flange. Thus, the weight and the strength of the follower gland is unaffected by the presence of the clearance recesses 52 due to the presence of the strengthening protuberances 53 at each of the clearance recesses.

The mechanical joint 10 is used for holding pipes 12 and 13 coupled together in a fluid conducting relationship. The joint restrains the pipes from being pulled apart while the gasket within the joint is expanded inwardly to effect a seal at the joint around the juncture between the bell and the plain pipe end. In assembling the mechanical joint the retainer gland 11 is first placed on the plain end portion 12a of the pipe 12 and moved back along the pipe from the end edge of the pipe. The gasket 22 is then positioned over the pipe end between the end edge of the pipe and the gland. The pipe end is inserted into the bell 14 of the pipe 13 until the end edge of the pipe engages the stop shoulder 23 within the bell. The gasket 22 is manipulated into the recess 21 of the bell and the gland is moved toward the bell flange 15 with the lip edge 33 of the gland engaging the gasket. The gland is positioned rotationally to align the bolt holes 34 of the gland flange 31 with the holes 20 of the bell flange 15. The tee-bolts 40 are then inserted through the aligned flange holes with the head 42 of each of the tee-bolts positioned on the side of the flange 15 toward the pipe 13. A nut 43 is threaded on the exposed end portion of each of the tee-bolt shanks extending from the back face 31a of the gland flange. In tightening the tee-bolts by rotation of the nuts 43, it is essential that the gland be brought up toward the pipe flange evenly, maintaining approximately the same distance between the gland and the bell flange at all points around the joint. This may be done by partially tightening the bottom bolts first, then the top bolts, next the bolts at either side, and finally the remaining bolts. These procedural steps are repeated for the even securing and movement of the follower gland toward the bell until all of the bolts are tightened to predetermined standard torque ranges for the particular bolt sizes employed. For example, in accordance with American Standard tables, a 1 inch bolt is tightened with a 12 inch wrench to a torque range of 70–100 foot pounds. It will be apparent from FIGS. 5 and 6 that as the bolts are tightened urging the retainer gland toward the bell flange, the squeezing coaction between the surfaces of the gasket recess 21 and the end edge 33 of the gland lip expands the gasket 22 inwardly around the pipe end portion 12a, thereby sealing against leakage along the space between the outer surface of the pipe end 12a and the bell 14 so that the mechanical joint provides for leakfree fluid flow.

After the joint is properly tightened by means of the tee-bolts, the set screws 51 are then tightened inwardly around the surface of the pipe end 12a for securely holding the gland 11 on the pipe 12 so that the mechanical joint resists separation of the pipes 12 and 13. The set screws are tightened with a torque wrench with special caution being taken, particularly in the instance of cast-iron pipe, not to break the pipe. A predetermined amount of torque, such as, for example, 90 foot pounds, is applied to each of the set screws for even tightening around the joint to a degree below that which would break the pipe 12 connected into the joints.

Figure 7:
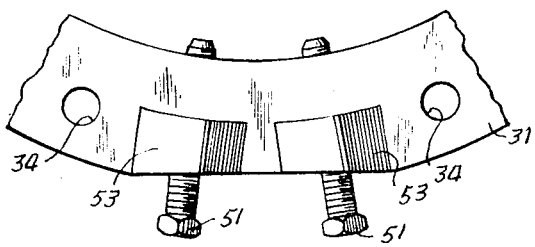
FIG. 7 is an enlarged fragmentary view in elevation showing the back face of a retainer gland utilizing two set screws between tee-head bolt holes.
Figure 8:
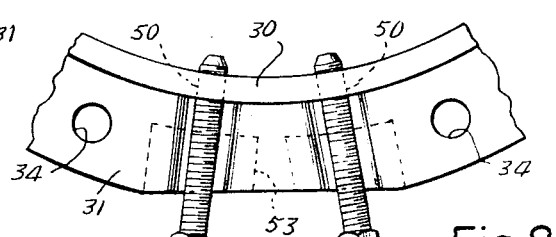
FIG. 8 is a fragmentary view in elevation of the front face of the retainer gland in FIG. 7, illustrating the set screws and the set screw clearance recesses in the gland flange; and, FIG. 9 is a fragmentary view in elevation showing the outside edge of the retainer gland of FIGS. 7 and 8.

The particular form of retainer gland used in the mechanical joint 10 illustrated in FIGS. 1–6, is generally used in pipe sizes below 8 inches in diameter. When the pipe sizes exceeds about 8 inches, it is preferred that an alternate form of the follower gland, as shown in FIGS. 7–9, be employed which permits the use of two set screws 51 between each of the tee-bolts holding the mechanical joint together. The shape, positioning, and other characteristics of the clearance recesses and protuberances used in the modified form of the follower gland of FIGS. 7–9 are identical to those of the gland as shown in FIGS. 1–6, with the only variations being those required to accommodate the set screws to the greater spacing of the bolt holes 34 for the larger pipe sizes. Thus, for purposes of illustration and this description, the structural features shown in FIGS. 7–9 are given the same reference numerals as used in the other figures, and the descriptions as applied to the other figures are equally applicable to FIGS. 7–9. It will be noted that the set screws 51 at their inward ends converge toward each other inasmuch as the screws are aligned each along an axis which intersects the axis or center of the retainer gland so that when the set screws are tightened against a plain pipe end, the force of each of the screws is toward the axis of the pipe. In some instances the particular size of the retainer gland may require that the protuberances extend somewhat closer to the bolt holes 34 than shown in FIG. 7, in which case it may be necessary to provide clearance around the bolt holes by cutting away a small bit of the material of the protuberance adjacent to the bolt hole to receive the nut 43 on the tee-bolt through the hole. Under any circumstances the protuberances are shaped and sized to provide substantially uniform material thickness in the flange 31 as it passes around each of the clearance recesses 52 for the set screws. The form of the retainer gland represented by FIGS. 7–9 is assembled in a mechanical joint and tightened in exactly the same manner as described previously, the only difference being that more tee-bolts and more set screws are required to be tightened.

It will now be recognized from the foregoing description and from the drawings that a new and improved retainer gland has been described and illustrated for use in a mechanical pipe joint of otherwise standard design. It will be seen that the retainer gland provides the means for coupling together two sections of pipe positioned end-to-end to provide a fluid tight connection between the pipes. It will also be recognized that a mechanical joint with the retainer gland of the invention minimizes and often eliminates the need for anchoring the pipes because the pipes are held by the joint against longitudinal movement apart. It will be seen that the use of the set screw clearance recesses and the protuberances on the retainer gland permits the placement of set screws through the gland without increasing the effective length of the lip while maintaining substantially uniform strength and the weight of the gland flange in accordance with present standards. In view of the fact that the effective length of the lip is not increased, it will also be seen that standard length tee-bolts are employed for connecting the mechanical joint together, such bolts being the same as used with a standard mechanical joint of the same dimensions which does not have provision for the locking set screws on the gland. While the mechanical pipe joint employing a retainer gland in accordance with the invention has been primarily considered and used with materials such as cast and ductible iron, it will be recognized that such a joint is equally useful with other materials such as some of the various forms of plastic pipe which are now available and also with steel pipe.

What is claimed and desired to be secured by Letters Patent is:

1. A retainer gland for use in a mechanical joint between pipe ends for coupling said pipe ends in fluid conducting relationship and holding said pipes against separation, said gland comprising: an annular member adapted to be positioned on a first of said pipes and having a lip portion substantially cylindrical in shape provided with a forward end edge for engaging a gasket disposed within an internal annular recess of a bell fitting on a second of said pipes, said annular member having an integral ring-shaped flange provided with a plurality of axially extending, circumferentially spaced bolt holes alignable with corresponding bolt holes on a flange of said bell fitting for receiving bolts for holding said gland to said bell fitting, said gland being provided with a plurality of circumferentially spaced radially extending tapped holes disposed partially through said lip and partially through said flange, each of said holes being adapted to receive a set screw for engaging a surface of said first pipe within said gland for locking said gland on said pipe surface, said flange portion of said gland having radially extending set screw clearance recesses formed along the front face of said flange and aligned with said tapped holes to provide clearance space along said flange to receive the shanks of set screws disposed through said tapped holes, and protuberances along the back face of said flange aligned with said clearance recesses whereby the wall thickness of said flange along said clearance recesses is substantially equal to the wall thickness of said flange between said clearance recesses.

2. A retainer gland for a mechanical joint in accordance with claim 1, wherein each of said clearance recesses is a substantially semi-cylindrical shape extending radially along the front face of said gland flange and developed along an axis substantially coincident with the axis of the set screw tapped hole aligned with said clearance recess and each of said flange protuberances has an outer arcuate surface disposed in generally parallel relationship with the surface of said flange defining the clearance recess aligned with said protuberance, whereby the wall thickness of the gland flange between each said clearance recess and the thickness of each flange protuberance remains substantially equal.

3. A retainer gland in accordance with claim 2, wherein each of said set screw tapped holes is positioned to dispose substantially half of said hole through said lip and half of said hole through said flange.

4. A retainer gland in accordance with claim 3, wherein one of said tapped set screw holes with a corresponding aligned set screw clearance recess and a flange protuberance are disposed between each pair of adjacent axially aligned holes in said gland flange.

5. A retainer gland in accordance with claim 4, including a set screw threaded through each of said tapped holes for releasably locking said gland on a pipe surface.

6. A retainer gland in accordance with claim 3, including at least two of said tapped set screw holes with corresponding set screw clearance recesses and flange protuberances positioned in circumferentially spaced relationship between each pair of adjacent axially aligned bolt holes in said gland flange.

7. A retainer gland in accordance with claim 6, including a set screw threaded through each of said tapped set screw holes for holding said gland on a pipe surface.

* * * * *